Figure 1:
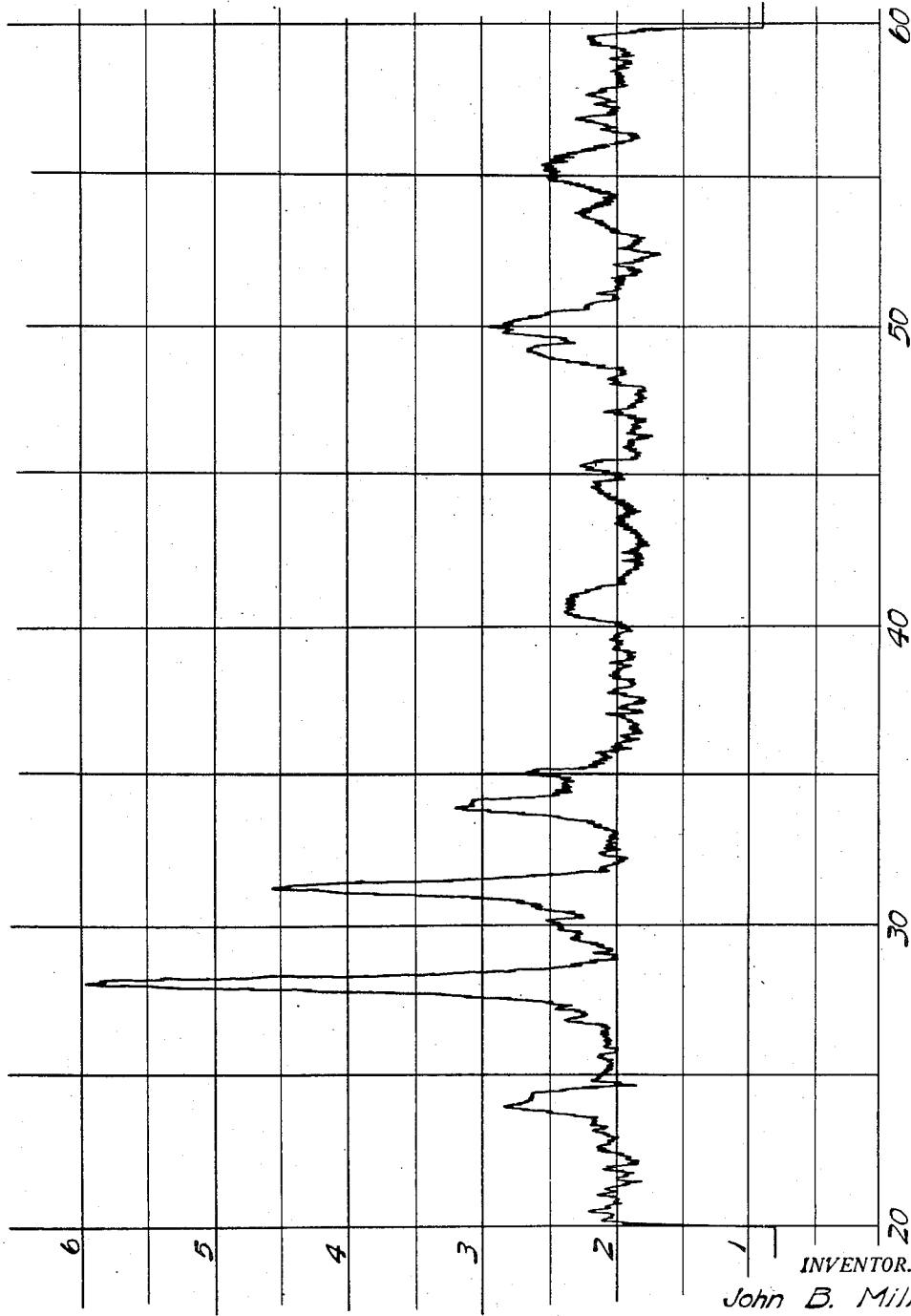

INVENTOR.
John B. Miller
BY
Beau, Brooks, Buckley + Beau
ATTORNEYS

UNITED STATES PATENT OFFICE 2,624,661

ZIRCONIUM OXIDE POLISHING MATERIAL

John B. Miller, Lewiston, N. Y., assignor to National Lead Company, New York, N. Y., a corporation of New Jersey Application December 3, 1949, Serial No. 131,041

1 Claim. (Cl. 51—309)

The present invention relates to an improved method for the preparation of highly purified zirconium dioxide product suitable for use as a polishing agent suitable, for instance, for polishing glass.

Heretofore, zirconium oxide and cerium oxide offered the sources of colorless materials employed in polishing glass and for many purposes had supplanted rouge. The trade requirements for a good polishing material were such that only highly purified zirconium dioxide of the type produced by controlled precipitation from chemically pure water soluble salts of zirconium could meet the specifications. The difficulty and expense of preparing a pure source for the zirconium dioxide militated against the use of the latter as a glass polishing agent.

In accordance with the present invention, zirconium dioxide is first prepared from the usual source zircon, or zirconium silicate, by reduction in the presence of carbon and air with the formation of complex carbon and nitrogen compounds designated as zirconium cyanonitride. This process is preferably performed in accordance with the procedure outlined in U. S. Patent No. 2,270,527 of January 20, 1942, granted to Charles J. Kinzie, Robert P. Easton and Viatcheslav V. Efimoff. Thereafter, as therein outlined, the zirconium cyanonitride is burned to zirconium oxide and the latter size graded smaller than 35 mesh.

Due to the presence in the crude end product of said Kinzie et al. Patent No. 2,270,527, of a considerable amount of carbon, which represents relatively large quantities of cyanonitride, dry grinding presents a definite hazard due to the presence, in finely divided form, of this inflammable cyanonitride. This explosion hazard had to be eliminated before the product of Kinzie et al. could be dry milled with complete assurance of safety.

In the wet milling of the product of Kinzie et al. Patent No. 2,270,527, a period of up to 120 hours was required to obtain a product in an acceptable range of fineness for polishing purposes. In contact with water, and during the grinding period, there is evolved a considerable amount of gaseous product which, on several occasions, caused explosion during the operation of removing the mill cover to release pressure and examine the charge.

It is an object of the present invention, therefore, to eliminate the hazards encountered in either dry milling or wet milling of the so prepared zirconium dioxide and materially to speed up the overall rate by a combination of these two processes.

In accordance with the present invention, the zirconium dioxide prepared from the cyanonitride is subjected to a high temperature calcination. In order suitably to prepare such material for subsequent processing, the calcination must be performed above 1050° C. and preferably at about 1300° C. Calcination at a temperature lower than about 1050° C. will not produce a product from which acceptable polishing agent can be prepared. While it is not known what change occurs during the calcination, it is sufficiently profound at 1300° C. to change the color and the fineness of the product. Furthermore, the so calcined material may be safely further dry milled without explosion or fire hazard.

Set forth below are the results of extensive examination of two samples of recalcined zirconium oxide obtained from zirconium cyanonitride as source material. Sample #1 was calcined at 850° C. and sample #2 at 1300° C., for 16 hours under oxidizing conditions.

Due to the great difference in behavior of the products calcined above and below about 1050° C., extensive examination of each product was made to determine the chemical and physical differences. Accordingly, examinations were made under the low power microscope and high power petrographic microscope. Chemical analyses were also made spectrographically and exact determination of carbon made by combustion and the products were examined with an X-ray spectrometer.

Low power microscopic examination

An examination under a low power microscope showed little difference between the samples except that sample #2 appeared to be somewhat finer than sample #1 and to exist in thin flakes. Presented below is a sieve analysis of the two products:

TABLE I

|  | Sample #1 | Sample #2 |
|---|---|---|
|  | Percent | Percent |
| +40 | 0.60 | 0.50 |
| −40 +60 mesh | 6.90 | 5.00 |
| −60 +80 mesh | 5.10 | 3.80 |
| −80 +100 mesh | 5.40 | 4.90 |
| −100 +120 mesh | 3.40 | 3.10 |
| −120 +140 mesh | 6.10 | 5.90 |
| −140 +160 mesh | 3.50 | 3.80 |
| −160 +180 mesh | 5.70 | 5.80 |
| −180 +200 mesh | 3.00 | 3.10 |
| −200 mesh | 61.60 | 65.00 |

Spectographic examination

An analysis of the two samples was made spectrographically for inorganic impurities with the following results, except that silica was determined chemically. Carbon was determined by combustion (a) without additions and (b) by mixture with red lead oxide in order to decompose any stable carbides. The results of the chemical analysis is set forth in Table II below:

TABLE II

| | Sample #1 | Sample #2 |
|---|---|---|
| $B_2O_3$ | 0.01 | 0.01 |
| $SiO_2$ | 3.25 | 3.14 |
| $Fe_2O_3$ | 0.09 | 0.06 |
| $MgO$ | 0.15 | 0.15 |
| $MnO_2$ | Trace | Trace |
| $Al_2O_3$ | 0.10 | 0.10 |
| $CaO$ | 0.05 | 0.05 |
| $V_2O_3$ | Trace | Trace |
| $TiO_2$ | 0.35 | 0.35 |
| $CuO$ | Trace | Trace |
| $Ni_2O_3$ | do | Do |
| $Cr_2O_3$ | do | Do |
| $K_2O$ | 0.02 | 0.05 |
| $BaO$ | Trace | Trace |
| $Na_2O$ | 0.01 | 0.05 |
| Carbon (without red lead) | 0.11 | 0.009 |
| Carbon (with red lead) | 0.36 | 0.170 |
| Balance | | Zirconium Oxide |

The relatively large difference between the "without red lead" carbon of the two samples is indeed significant. Sample #1 contains slightly more than 12 times as much of this type of carbon as compared with sample #2. The presence of 0.11% carbon is sufficient to account for about 3% by weight of zirconium cyanonitride and sufficient, evidently, to account for the approximately 20% of the partially altered group A material referred to under "Petrographic examination" below. With respect to the carbon "with red lead," if present as silicon carbide, there was about 0.83% SiC in No. 1 and about 0.53% SiC in No. 2.

*Petrographic examination*

In this examination, portions of samples 1 and 2 were each reduced to about 200 mesh by grinding in an agate mortar with an agate pestle. Sample #1 appeared to be more difficult to grind.

These samples were examined under a high power petrographic microscope and the materials present were classified into four main groups as follows:

*Group A.*—Black opaque material presumably complexes of carbon and zirconium with an oxidized surface layer.

*Group B.*—Colorless material with a refractive index of approximately 1.98; presumably an $SiO_2$—$ZrO_2$ product lower in $SiO_2$ than is zircon.

*Group C.*—Brownish colored material of high refractive index. The refractive index of this material in 1 ranges from 2.02 to 2.11, while in 2 the range is 2.09 to 2.11. Apparently a $ZrO_2$ of lower refractive index than that for baddeleyite.

*Group D.*—Zirconium oxide with a refractive index above 2.20. The refractive index of this material in sample 2 is apparently higher than for sample 1. The individual crystals are too fine for positive identification as to crystal form.

Based on volume estimates, it is believed that the four groups of materials, namely, A, B, C and D occur in approximately the percentages given in Table III:

TABLE III

| | Sample #1 | Sample #2 |
|---|---|---|
| | *Percent* | *Percent* |
| Material A | 20 | 0.5 |
| Material B | 5 | 1.0 |
| Material C | 70 | 38.5 |
| Material D | 5 | 60.0 |

It is quite significant that in sample #2 the materials of groups A and B have been substantially eliminated there being a reduction of 40 to 1 in the undesired materials of group A, and 5 to 1 of the materials in group B, with the result that the product can be classed petrographically as one containing more than 98½% crystalline zirconia.

*Examination by Geiger X-ray spectrometer*

Portions of samples 1 and 2 were examined with a Geiger X-ray spectrometer as was a sample of chemically pure, finely divided zirconium oxide, the particle size of which was in the particle size range 0.5 to 2 microns and which was monoclinic zirconia.

Such an instrument provides a graphical representation of the impulses or quantity of energy fed to a Geiger-Müller tube from a source of X-rays.

Figure 2:
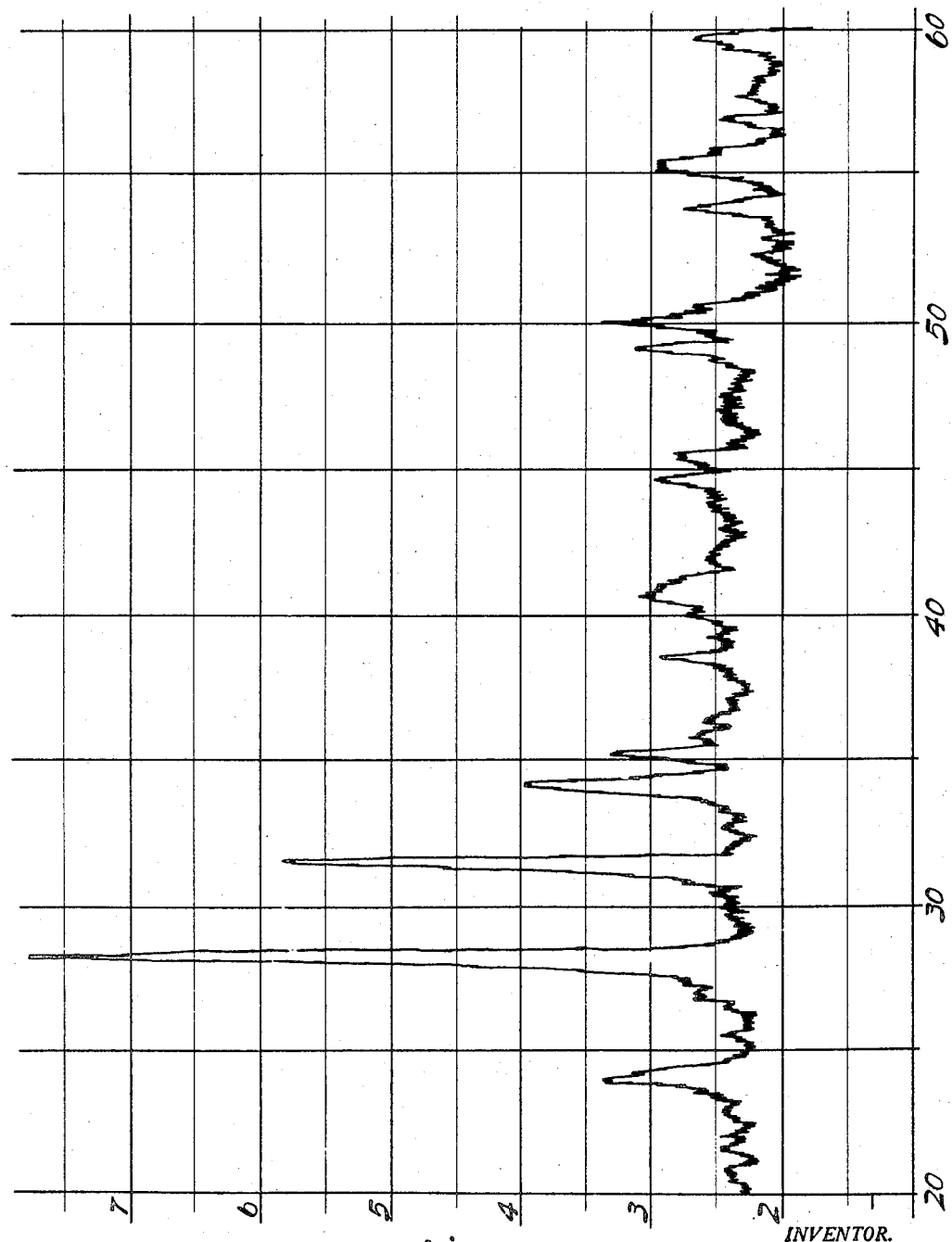

In the drawings, Fig. 1 is a graph obtained upon examination of sample 1; Fig. 2 that obtained from sample 2, and Fig. 3 that obtained from the pure zirconia. The graphs prove the existence of a crystalline structure which when subjected to X-ray analysis give the following interplanar spacings ($d$) in angstrom units with the corresponding relative intensities ($I$):

| ($d$) | $I$ |
|---|---|
| 3.17 | 10.0 |
| 2.84 | 7.0 |
| 1.82 | 2.5 |
| 2.63 | 2.5 |

Figure 3:
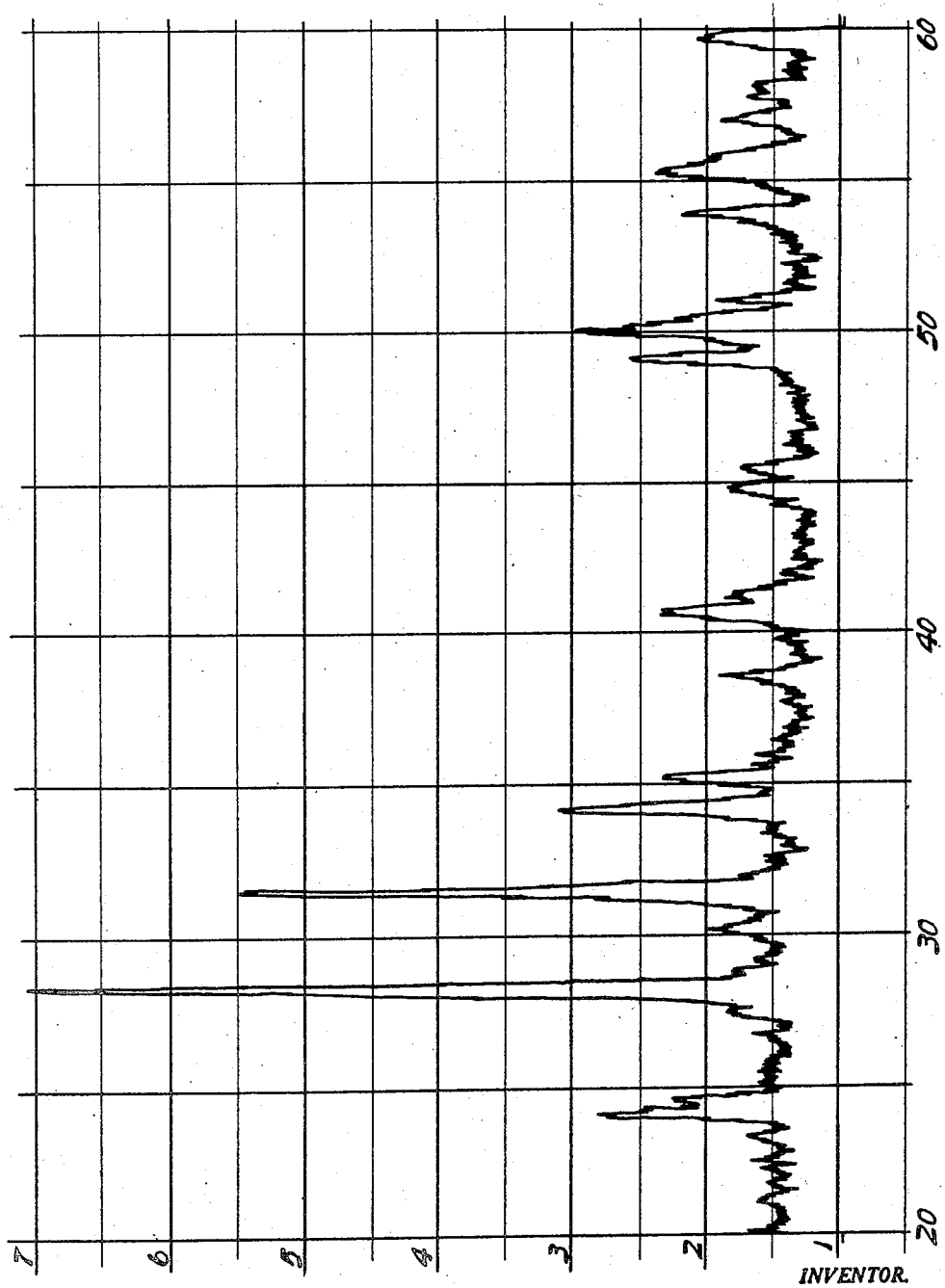

The crystalline material so designated is monoclinic zirconium oxide. The greater intensities of the peaks in Figs. 2 and 3 are due to the better crystal development as compared to Fig. 1. However, whatever the difference may be between the products obtained by calcining zirconium oxide obtained by oxidation of the cyanonitride, the product calcined at above 1050° C. has been found to be suitable for subsequent processing to produce a polishing compound.

The polishing material of the present invention is prepared from zirconia as raw material produced by oxidation of the cyanonitride and which is less than 35 mesh as, for instance, that described in U. S. Patent 2,270,527 by first calcining at about 1300° C. and then dry and wet grinding to a particle size of less than 5 microns.

The process of the present invention is preferably practiced as follows:

A zirconium oxide conglomerate is prepared in accordance with the disclosures of U. S. Patent No. 2,270,527 and the resulting −35 mesh material calcined. The material is preferably fed into a 7' diameter, 40' long rotary tube calciner at a rate of about 1500 pounds per hour and subjected to a temperature of about 1300° C. Upon discharging from the kiln, the hot material is passed through a revolving cooler which cools the calcined material to a convenient handling temperature. The chemically stable cooled product is then passed through a continuous feed continuous discharge dry grinding mill. A mill may be chosen which is lined with porcelain brick and is loaded with a charge of porcelain balls serving as grinding media. Associated with the mill circuit is a conventional air classification system which automatically classifies the dry discharge into a −44 micron material and a +44 micron material, the latter being automatically returned to the feed circuit, while the former proceeds into the next step of the process which consists of mixing with water and wet grinding, passing the wet milled product through a hydraulic classifier which removes the −5 micron material from the +5 micron material which latter is reground and the operation repeated until all has been reduced to a −5 micron in size. It is to be noted that during this wet grinding operation the gases so characteristic of wet milling the −35 mesh product of U. S. Patent No. 2,270,527 did not appear and no special precautions now appear necessary in wet milling the highly calcined product.

In wet milling and classification, it was noted that about 20% of the solids were obtained as a −5 micron product on each pass through the system. Upon completion of the wet grinding operation the −5 micron material was blended and then dried, disintegrated to powder and packed for sale.

An average sample taken from about fifteen tons of this −5 micron material proved, upon examination, to contain about the same amount and kind of impurities as shown for sample 2, except that the silica content was 5.67% as compared with 3.14% $SiO_2$ in sample 2. The particle size was substantially all in the range 0.5 to 5 micron.

The product was mainly crystalline zirconium oxide, the refractive index of which was in the range 2.09 to 2.23. The zirconia so obtained contains from 3% to 6% silica by weight and about .05% of a stable carbide such as siliconcarbide.

What is claimed is:

The process of deriving a finely divided zirconium oxide polishing agent from crude zirconium oxide containing as an impurity inflammable zirconium compound which consists in calcining said product under oxidizing conditions at a temperature of approximately 1300° C. until the product is rendered non-inflammable, thereafter dry milling said product to a particle size of less than about 44 microns and thereafter continuing size reduction by wet milling to less than 5 microns.

JOHN B. MILLER.

REFERENCES CITED

The following references are of record in the file of this patent:

UNITED STATES PATENTS

| Number | Name | Date |
| --- | --- | --- |
| 1,558,476 | Kinzie | June 15, 1926 |
| 1,881,303 | Weiss | Oct. 4, 1932 |
| 2,270,527 | Kinzie | Jan. 20, 1942 |
| 2,315,519 | Hake et al. | Apr. 16, 1943 |
| 2,489,307 | Miller | Nov. 29, 1949 |

OTHER REFERENCES

Riegel: "Chemical Machinery," pp. 33 and 34, Reinhold Pub. Co., N. Y. (1944).

Condensed Chemical Dictionary, 3d ed., Reinhold Pub. Co., N. Y. (1942), p. 689.